J. W. SHEA, Sr.
POWER MANURE LOADER.
APPLICATION FILED APR. 2, 1917.

1,268,395.

Patented June 4, 1918.
2 SHEETS—SHEET 1.

INVENTOR:
J. W. Shea Sr.
BY HIS ATTORNEY:
A. M. Carlsen.

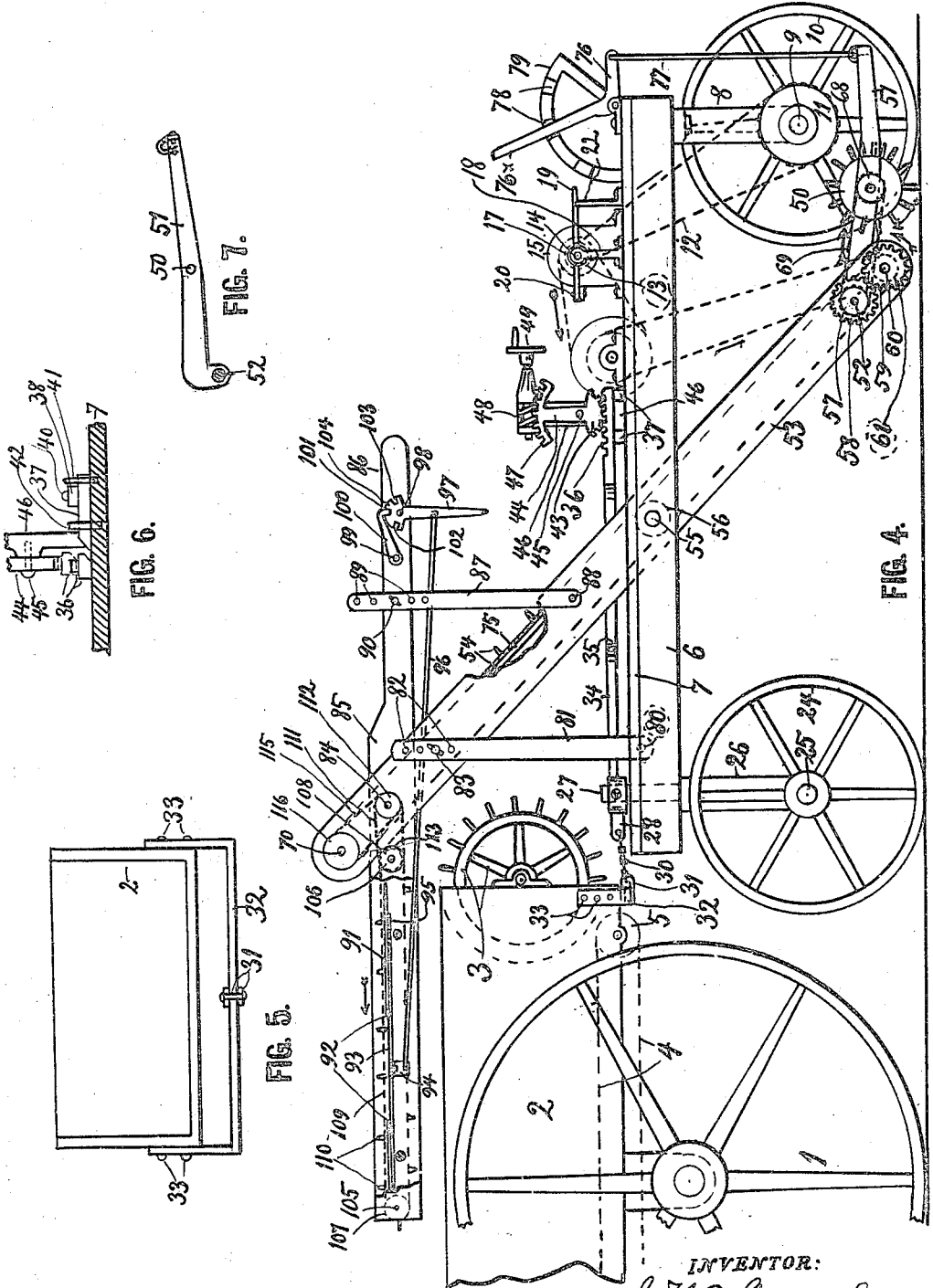

UNITED STATES PATENT OFFICE.

JAMES W. SHEA, SR., OF HANKINSON, NORTH DAKOTA.

POWER MANURE-LOADER.

1,268,395.                Specification of Letters Patent.        Patented June 4, 1918.

Application filed April 2, 1917. Serial No. 159,101.

*To all whom it may concern:*

Be it known that I, JAMES W. SHEA, Sr., a citizen of the United States, residing at Hankinson, in the county of Richland and State of North Dakota, have invented a new and useful Power Manure-Loader, of which the following is a specification.

My invention relates to improvements in loading machines and is especially adapted for loading manure into the wagon shaped devices known as manure spreaders, though it may also be used for gathering and loading earth, gravel, potatoes and other substances from the ground into wagons either in motion or standing still.

Figure 1:
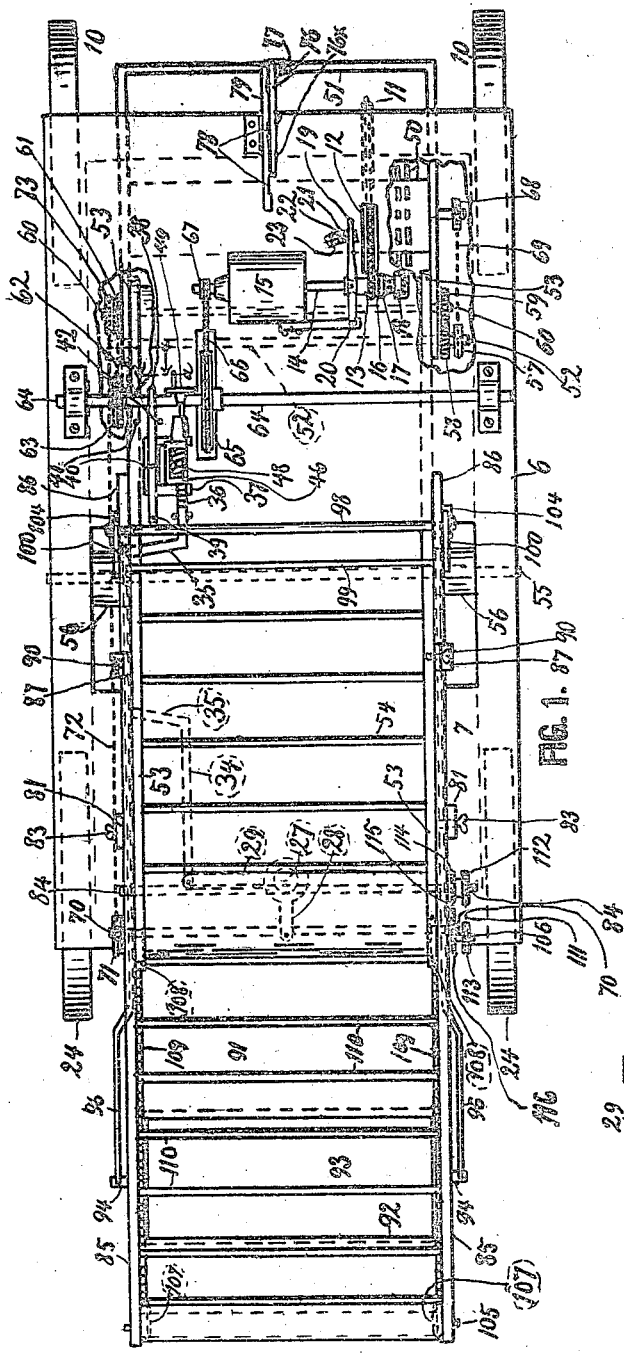
Figure 3:
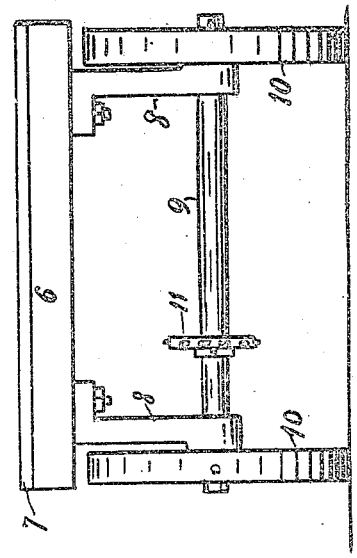
Figure 2:
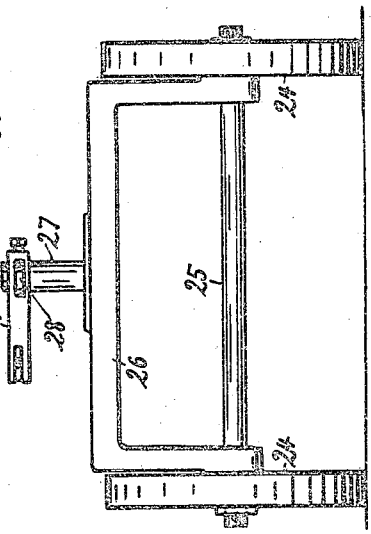

In the accompanying drawing: Figure 1 is a top or plan view of my complete loading machine. Fig. 2 is a front elevation of the front wheels with their axle and steering fork. Fig. 3 is a rear end elevation of the main frame and its supporting wheels and axle. Fig. 4 is a left hand side elevation of the loader with one of its hind wheels removed and the loader shown as attached to the rear portion of a manure spreader. Fig. 5 is a rear end elevation of the box of the manure spreader showing how a downward bale is secured to it to create a hitching bar for the loader. Fig. 6 is a section on the line *a—a* in Fig. 1 showing the means by which the steering wheels when so desired may be readily uncoupled from the hand-wheel otherwise operating them. Fig. 7 is a detail side view of the bail 51 in Fig. 1.

Referring to the drawings by reference numerals, 1 designates the hind wheels of a manure spreader having the usual box 2 with a spreader wheel 3 and a flexible bottom 4 operated by a roller 5 so as to feed the bottom gradually with the load against the roller 3. The chains, sprockets and other means by which the ground wheels 1 drive the rollers 3 and 5, are not shown because they are no parts of my invention and because they are well known in manure spreaders.

The machine I employ for loading the box 2 is composed of a main frame 6 covered by a deck 7 having apertures for certain parts to extend through it. The rear end of the said frame is supported by bearings 8, an axle 9 journaled therein and two ground wheels 10, of which one is fixed on the axle so as to act as a traction wheel when the axle is rotated by a sprocket 11 fixed on it and having a chain 12 driven by a small sprocket or pinion 13, which is rotatable on the shaft 14 of an engine 15 mounted on the deck. Said sprocket pinion has one side formed with a friction clutch member 16, facing a friction clutch member 17 which is fixed on the engine shaft near the bearing 18 of the latter. The clutch member 13 is slidable on the engine shaft and controlled by a shifter lever 19, which is pivoted at 20 and has its free end arranged for engagement in a notch 21 of a section 22 when the clutch is in action and in a notch 23 when the clutch is idle.

The front end of the frame is supported by two steering wheels 24, an axle 25 and a fork 26 having a stem 27 journaled in the frame and above the same provided with a short pole 28 and a lateral arm 29. When the loader is to be drawn and steered by the spreader (the latter being drawn by horses) the pole 28 is attached by a chain 30 and a clevis 31 to a transverse bar 32, which is spaced below the spreader box so as not to interfere with the rollers 3 and 5, and has its ends bent upward and secured by bolts 33 to the box 2 of the spreader. Said chain 30 may preferably be a regular jack chain having one end passed through the clevis 31 and provided with a grab hook (not shown), so that the chain may be shortened and lengthened by engaging the hook with different links of the chain 5, a method so well known that it needs no further illustration.

The arm 29 is pivotally attached to a rod 34, which is off-set at 35 to clear the main elevator and has its rear end provided with an upwardly facing guided rack 36, adapted to be raised by a wedge 37, which is slidable on the deck and operated by a foot lever 38, which is fulcrumed at 39, is pivoted at 40 to the wedge and has its free end playing between two pegs 41, 42. When the lever is against the peg 42, the wedge holds the rack upward in mesh with a toothed section 43 (see Fig. 4) of a lever 44, which is pivoted at 45 to a post 46, and has its upper end formed with a toothed section 47, meshing with a worm-screw 48 journaled in the top of the post and operated by a hand wheel 49, by which the loader is steered when attached from the spreader and moved forward by its own engine and rear traction wheel, but when the chain 30 is applied or hitched to the spreader so as to gather more thinly spread manure in a yard and load the same, the wedge 36 is retracted so as to let the rack drop out of gear and remain idle so the tongue 28 may do the steering of the front wheels.

The loading means proper involve a toothed roller 50 journaled in a bail 51. Said bail has its legs pivoted on a rod 52 which extends through the inclined frame 53 of an endless main elevator 54. Said frame is pivotally mounted on a bar 55 in the main frame 6 and is spaced therefrom by collars 56. One end of the bar 52 forms a stud upon which rotates a combined sprocket 57 and gear 58. Said gear is driven by a gear 59 fixed on the lower elevator shaft 60 and the latter shaft is rotated by a sprocket 61 fixed at the other end of it and driven by a chain 62 and a sprocket 63 which is secured on the shaft 64. Said shaft 64 is journaled across the frame and provided with a fixed sprocket 65, driven by a chain 66 from a small sprocket 67 fixed on the shaft of the engine. The roller 50 is provided with a sprocket 68, driven by a chain 69 from the sprocket 57.

As best shown in Fig. 1 the elevator 54 has its upper shaft 70 provided with a sprocket 71 driven by a chain 72 and a sprocket 73 fixed on the shaft 60. In this way both the upper and lower elevator shafts are driven, which divides the strain upon the two runs of the endless apron 54, whose upper run is supported upon the internal board 75 of the elevator frame, the lower shaft 60 serving also to drive the roller 50 by gears and sprockets as described.

Mounted upon the rear end of the frame 6 is an L-shaped lever 76, having its short arm connected by a rod 77 to the bail 51 so as to raise and lower the roller 50 by moving the long arm 76$^x$ into the various notches 78 of a bracket 79 fixed near one side of the lever.

In each side of the main frame is pivoted at 80 the lower end of a vertical brace 81, having near its upper end several holes 82 adapted to be placed on a pin or screw 83 in the side of the elevator frame 53 which may thus be held at various inclines so as to raise either end of it as may be required.

Fulcrumed on a bar 84 near the upper end of the elevator is a frame 85, whose rear portion is mainly a pair of arms 86 adjustable up and down on perforated braces 87 pivoted at 88 to the elevator frame and having several holes 89, either of which may go upon bolts 90 in the arms.

In the forward portion of the frame 85 is a floor 91 with a large aperture 92, with a slidable plate 93 close below it to close the aperture when so desired; said plate or shutter has ears 94 projected through slits 95 in the frame and connected by rods 96 to levers 97 fixed one at each end of a rock shaft 98 journaled in the arms 86. In said arms is also journaled a rock shaft 99, having at each end a catch 100, adapted to engage either one of three notches 101, 102, 103 in a cam 104 formed on each of the levers 97.

In the forward portion of the frame 85 are also journaled two shafts 105, 106 with suitable sprockets 107, 108, to operate endless chains 109, on which cross bars 110 are fixed. The upper run of the conveyer thus created moves along the top of the floor 91 when the shaft 106 is rotated by its sprocket 113 and a chain 111 from a double sprocket 112—114 which is journaled on the end of the bar 84 as a stud, the part 114 of the sprocket being driven by a chain 115 from a sprocket 116, fixed on the shaft 70.

In the operation of the machine the roller 50 digs and throws the manure from the hill of it on the ground onto the elevator 54, which delivers it upon the conveyer floor 91, where the bars 110 move it along out of the conveyer and let it drop into the box 2 of the spreader; and to spread the manure in the spreader, some of it may be dropped down through the aperture 92 in the floor 91 alternately in front and in rear of the shutter 93 according as the latter be regulated by the levers 97 and catches 100, it being understood that the levers are operated in unison and the catches likewise, and that when the catch is in the middle notch 101 the shutter is closed, if the catch is in notch 102 or 103 there will be an opening in rear or front of the shutter. To further spread the manure in the box 2, the bottom of the box may be gradually moved forward by any suitable ratchet arrangement which is usually found on such spreaders.

If during the operation the manure is to be gathered from a more or less thin layer on the ground, the machine may be kept in slow motion either by the chain 30 and the team hitched to the spreader, or it may be propelled slowly along by its own engine, which is doing the digging and loading, and the clutch 16, 17. The latter propelling means and the steering mechanism is however especially to be used in driving the loader idle to and from the work and in using it as a tractor. In loading from a big pile of manure, it is obvious that the loading mechanism need be in operation, and only as the pile diminishes the operator may now and then press on the clutch lever 19 so as to cause a slight forward movement of the whole machine. In using the spreader as a spreader it is unhitched from the loader.

What I claim is:

In a loader, a horizontally disposed conveyer having a floor with an elongated opening in it, an endless skeleton apron operating over the floor, and a slidable shutter below the opening, and capable of covering said opening, or a portion at either end thereof; the space below the conveyer being substantially unobstructed.

In testimony whereof I affix my signature.

JAMES W. SHEA, Sr.

Copies of this patent may be obtained for five cents each, by addressing the "Commissioner of Patents, Washington, D. C."